United States Patent [19]

Clark

[11] 4,303,299

[45] Dec. 1, 1981

[54] HAND-HELD INSTRUMENT FOR INSPECTING DRILL BITS

[76] Inventor: Gary R. Clark, 2965 Cohansey Dr., San Jose, Calif. 95132

[21] Appl. No.: 40,506

[22] Filed: May 21, 1979

[51] Int. Cl.³ ............................................. G02B 21/24
[52] U.S. Cl. ...................................... 350/90; 350/239
[58] Field of Search ................... 350/81, 82, 90, 238, 350/239, 243, 244; 356/237

[56] References Cited

U.S. PATENT DOCUMENTS 3,167,869  2/1965  Raney et al. .................... 350/239 X
3,450,458  6/1969  Potrzuski ....................... 350/239 X

FOREIGN PATENT DOCUMENTS 155379  10/1952  United Kingdom ................. 350/90

Primary Examiner—John K. Corbin
Assistant Examiner—Matthew W. Koren
Attorney, Agent, or Firm—Flehr, Hohbach, Test, Albritton & Herbert

[57] ABSTRACT

A hand-held instrument for examining a drill bit, comprising a stand of transparent material, a microscope mounted on the stand, and means carried by the stand for holding the drill bit in position to be viewed through the microscope when the instrument is held up to the eye of the user.

4 Claims, 2 Drawing Figures

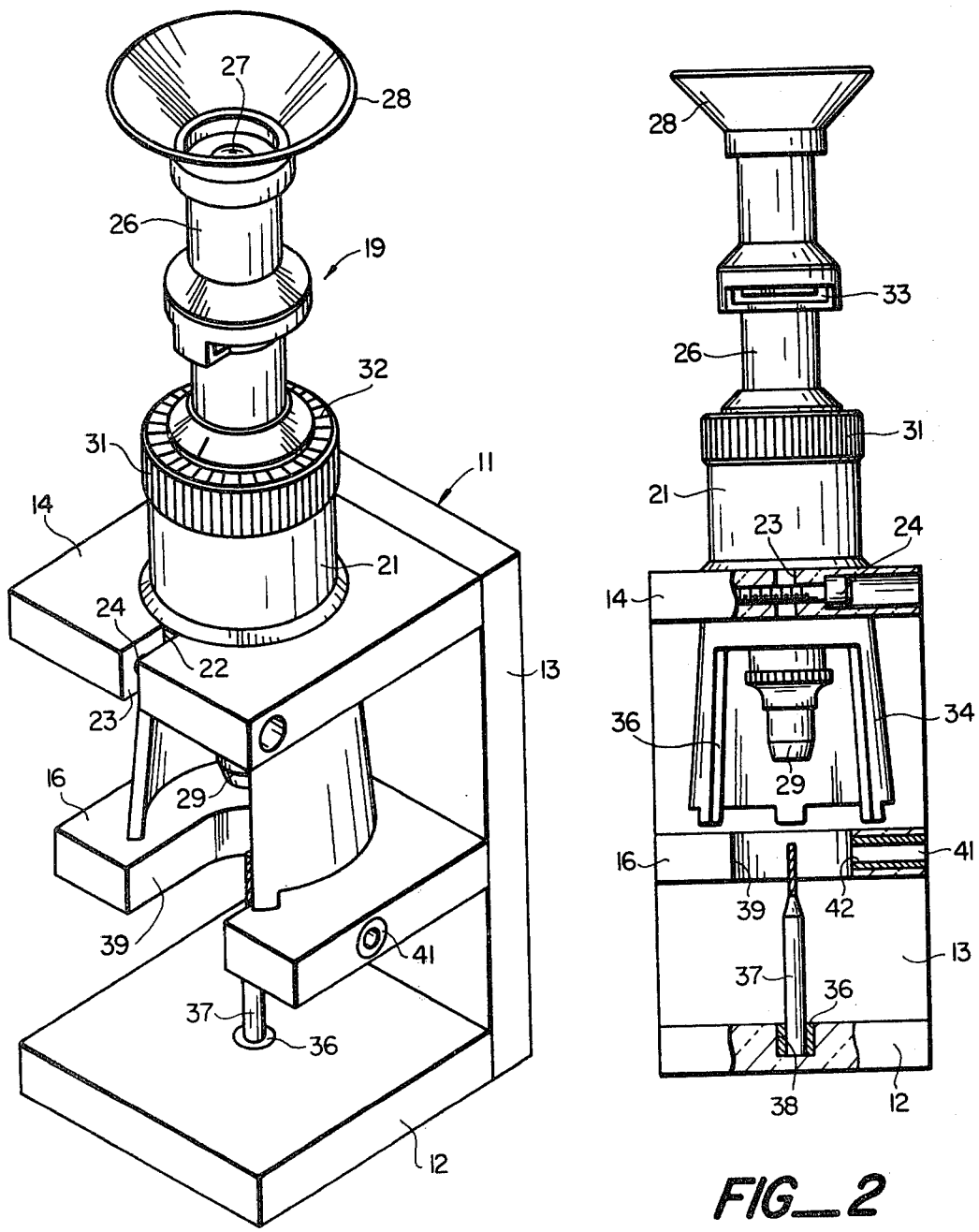
FIG_1
FIG_2

HAND-HELD INSTRUMENT FOR INSPECTING DRILL BITS

This invention pertains generally to instruments for inspecting drill bits and more particularly to a hand-held instrument for inspecting drill bits of the type utilized in the manufacture of printed circuit boards.

The cutting edges of drill bits utilized for drilling lead holes in printed circuit boards must be kept sharp in order to provide efficient cutting and clean holes. Such bits are of relatively small diameter, e.g., 0.006–0.0935 inch, and the cutting edges of these small bits cannot be inspected with the naked eye.

Heretofore, drill bits for printed circuit boards have been inspected with relatively large, expensive stereo microscopes. These microscopes are generally mounted in a fixed location on a table or bench, and the drill bits must be carried from the location where they are used or sharpened to the microscope station for inspection. With larger drill bits, the cutting edges can be inspected with an eye loupe, but eye loupes do not generally have sufficient magnification for the relatively small drill bits used on circuit boards.

It is in general an object of the invention to provide a new and improved instrument for inspecting drill bits of the type utilized in the manufacture of printed circuit boards.

Another object of the invention is to provide an instrument of the above character which is hand-held and easy to use.

Another object of the invention is to provide an instrument of the above character which is economical to manufacture.

These and other objects are achieved in accordance with the invention by providing a hand-held instrument having a stand of transparent material, a microscope mounted on the stand, and means carried by the stand for holding a drill bit with the tip of the same in position to be viewed through the microscope when the instrument is held up to the eye of the user.

FIG. 1 is an isometric view of one embodiment of a handheld instrument for inspecting drill bits in accordance with the invention.

FIG. 2 is a front elevational view, partly broken away, of the embodiment of FIG. 1.

As illustrated in the drawings, the instrument for inspecting drill bits comprises a stand 11 having a horizontally extending base 12, an upright arm 13, an upper arm 14 spaced above the base, and a central arm 16 positioned between the upper arm and base. The stand is fabricated of a rigid material such as Plexiglas which is transparent to light, and the upright arm is affixed to the base and the remaining arms by suitable means such as screws (not shown) or cementing.

A microscope 19 is mounted on the upper arm of the stand for viewing a drill bit held by the instrument. The microscope includes a cylindrical body 21 which is received in a vertically extending opening 22 in arm 14. This arm is split toward the front as indicated at 23 and a screw 24 clamps the two portions of the arm together to grip the body of the microscope.

The microscope also includes a barrel assembly 26 with an eyepiece 27 and an eyecup 28 toward the upper end of the barrel, and an objective lens 29 toward the lower end. A focusing ring 31 provides means for adjusting the axial position of the barrel assembly within the body, and a scale 32 on the focusing ring indicates the position of the barrel assembly. In the preferred embodiment, this scale is calibrated in units of length and can be utilized to determine the relative length of drill bits. The barrel assembly also includes a chamber or slot 33 for holding a reticle (not shown). The microscope also includes a light-transparent shield 34 which depends from body 21 and surrounds objective lens 29, with a forwardly facing window 36.

The microscope can be an inexpensive device of suitable magnifying power for providing an enlarged image of a drill bit. For drill bits having a diameter on the order of 0.006–0.043 inch, a microscope having a magnification of 50× is suitable, and for drill bits having a diameter on the order of 0.012–0.0935 inch, a magnification on the order of 25× is suitable.

Means is provided for holding the drill bits in position to be viewed through the microscope when the instrument is held up to the eye of the user. This means includes a bushing 36 mounted in base 12 in alignment with the optical axis of the microscope. The bushing has a bore of slightly larger diameter than the shank of a drill bit 37 and thereby provides a socket for slidably receiving the shank of the bit, with the tip of the bit facing in an upward direction toward the microscope. Since the shanks of drill bits for printed circuit boards are generally of a uniform size (e.g., 0.125 inch) regardless of the diameter of the cutting portion of the drill, the instrument can be utilized with drills of different sizes without changing the bushing. In the embodiment illustrated, the bushing is mounted in a blind bore 38 in the base, with the bottom wall of the bore serving as a limiting abutment or reference for the end of the drill shank. The front portion of central arm 16 is cut away, as indicated at 39, to facilitate insertion and removal of the drill bit and to provide clearance around the optical axis of the microscope.

Means is also provided for holding drill bits in position to be viewed from the side through the microscope. This means includes a second bushing 41 extending horizontally through one side of central arm 16 with a bore 42 for receiving the shank of a bit. This bore extends in a direction perpendicular to the axis of the microscope, and a drill bit held by this bushing can readily be positioned with its tip in alignment with the axis of the microscope.

Operation and use of the instrument is as follows. To inspect the tip of a drill bit from the end, the shank of the bit is inserted into bushing 36, and focusing ring 31 is adjusted to focus on the upwardly facing tip of the bit. To inspect the bit from the side, the shank is inserted into bushing 42, and the tip is positioned in alignment with the axis of the microscope. Ring 31 is then adjusted to focus upon the portion of the bit to be examined. To determine the relative lengths of bits, the bits are placed successively in bushing 36, ring 31 is adjusted to focus on the tips of the bits, and the readings of scale 32 are compared to determine the relative lengths of the bits.

The invention has a number of important features and advantages. The entire instrument is of a size and weight such that it can be readily held in one hand and moved as desired. The transparent stand permits external light to reach the tip of the bit, and no special lighting is required. The bushings provide means for quickly and accurately positioning the drill bits and, in addition, permit the bits to be viewed either from the end or from the side.

It is apparent from the foregoing that a new and improved instrument for inspecting drill bits has been provided. While only one presently preferred embodiment has been described in detail, as will be apparent to those familiar with the art, certain changes and modifications can be made without departing from the scope of the invention as defined by the following claims.

What is claimed is:

1. A hand-held instrument for inspecting a drill bit, comprising: a stand of transparent material, microscope means mounted on the stand, and means forming a socket in the stand for receiving the shank of the drill bit and holding the bit only by the shank, the tip of the bit being free of any supporting structure and in position to be viewed through the microscope means when the instrument is held up to the eye of the user.

2. The instrument of claim 1 wherein the socket is aligned axially with the optical axis of the microscope means and includes a bottom wall which engages the end of the shank as a limiting abutment to hold the bit in a predetermined axial position relative to the microscope means.

3. The instrument of claim 1 wherein the socket is positioned with the axis perpendicular to the axis of the microscope means.

4. A hand-held instrument for inspecting drill bits, comprising: a stand having a horizontally extending base and an upright arm fabricated of a rigid material which is transparent to light, microscope means mounted on the upper portion of the arm above the base, a bushing mounted on the base below the microscope means for receiving the shank of a drill bit and holding the bit in alignment with the optical axis of the microscope means and the tip of the bit in position to be viewed through the microscope means when the instrument is held up to the eye of the user, an arm of transparent material extending horizontally from the upright arm at a predetermined position between the base and microscope means, and a second bushing carried by the horizontally extending arm for receiving the shank of a drill bit and holding the bit perpendicular to the axis of the microscope means with the tip of the bit in position to be viewed through the microscope means.

* * * * *